April 7, 1959 C. J. KENNEDY 2,881,375
SERVO SYSTEM

Filed May 3, 1956 2 Sheets-Sheet 1

INVENTOR.
CHARLES J. KENNEDY
BY Robert H. Fraser
ATTORNEY

April 7, 1959 C. J. KENNEDY 2,881,375
SERVO SYSTEM

Filed May 3, 1956 2 Sheets-Sheet 2

INVENTOR.
CHARLES J. KENNEDY
BY
Robert H. Fraser
ATTORNEY

United States Patent Office 2,881,375
Patented Apr. 7, 1959

2,881,375

SERVO SYSTEM

Charles J. Kennedy, Pasadena, Calif., assignor to F. L. Moseley Co., a corporation of California Application May 3, 1956, Serial No. 582,433

8 Claims. (Cl. 318—28)

This invention relates to servo systems, and more particular to servo systems adapted to operate on the null balance principle.

In servo systems operating on the null balance principle, a signal representing a variable may be applied to a comparison circuit which is adapted to provide an output signal in response to a condition of unbalance in the system. The signal appearing at the output of the comparison circuit may be amplified and used to control the position of a mechanical element by means of a motor. Usually, the motor is linked to the contactor of a potentiometer across which a standard voltage is connected. The voltage from the potentiometer contactor is applied to the comparison circuit and opposed to the input signal. In a condition of balance, the output signal from the comparison circuit becomes substantially zero, and the mechanical portion of the system is at rest. As the input signal varies, the mechanical system follows the variations, and the servo system as a whole functions as a translator for converting an electrical signal to mechanical movement.

A difficulty encountered in servo systems utilizing a potentiometer is the generation of spurious signals, i.e. noise, by the action of the potentiometer contactor in engaging the resistance element of the potentiometer. Also, the contactor is subject to mechanical wear as it slides along the resistance element, resulting in spurious signals. Frequently, the magnitude of such spurious signals is great enough to mask or distort relatively low level input signals and cause improper operation of the servo system.

Another difficulty in servo systems using a potentiometer as a balancing element, and in which a source of unidirectional voltage is impressed across the potentiometer, is that the source must maintain a relatively constant voltage output. Because of the difficulty of providing a constant unidirectional voltage from the alternating current supplied commercially, most servo systems include a standard cell as a source of unidirectional voltage. With age and use, the output voltage from a standard cell decreases, and consequently, it is necessary to replace cells from time to time.

In accordance with the present invention, an improved servo system is provided including a balancing circuit. A differential transformer is connected to pass a rebalancing signal to the balancing circuit, a source of alternating current is connected to the differential transformer, and the core of the differential transformer is positioned in response to signals appearing at the output of the balancing circuit. Through the use of a differential transformer as a balancing element in accordance with the present invention, the conventional potentiometer normally required in a null balance type servo system may be eliminated. Consequently, the generation of spurious signals of the type described above is substantially eliminated. In addition, through the use of a differential transformer as a balancing element in accordance with the present invention, a rebalancing signal may be derived from a regulated source of alternating current.

A better understanding of the invention may be had upon a reading of the following detailed description and an inspection of the drawings, in which.

Figure 1:
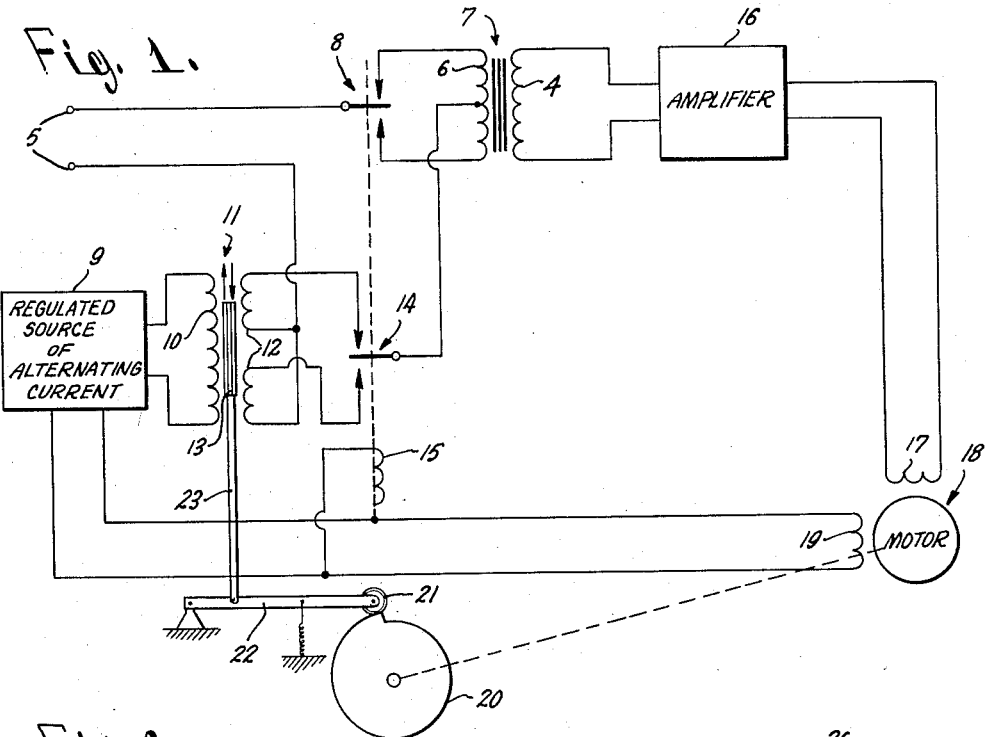
Fig. 1 is a combined block and schematic circuit diagram of a servo system including a balancing circuit and differential-transformer balancing element.

In the servo system of Fig. 1, an input signal may be applied to a pair of input terminals 5. The input signal is passed to a center-tapped primary winding 6 of a transformer 7 via a set of single-pole-double-throw contacts 8 which may be included in a conventional vibrator. In operation, a balancing operation takes place between the input signal and a rebalancing signal which is applied to the center tap on the primary winding 6.

In order to generate the rebalancing signal, an alternating current wave from a regulated source of alternating current 9 is applied to a primary winding 10 of a differential transformer 11. In addition to the primary winding 10, the differential transformer 11 includes a divided secondary winding 12, and a movable core 13. By connecting the separate sections of the secondary winding 12 in phase opposition, the phase and amplitude of the wave appearing at the output may be varied by moving the core 13. That is, a movement of the core 13 in one direction causes a wave to appear across the secondary winding 12 of one phase, and a movement of the core 13 in the other direction causes a wave to appear across the secondary winding of opposite phase. The amplitude of the wave appearing across the secondary winding 12 is a function of the extent to which the core 13 is moved, and in an intermediate position, the waves appearing across the separate sections of the secondary winding 12 tend to cancel one another, resulting in substantially no net output signal being provided across the secondary winding 12.

In Fig. 1, the wave appearing at the output of the secondary winding 12 is applied to the fixed contacts of a single-pole double-throw set of contacts 14. The contacts 14 may be mechanically linked to the contacts 8 in a conventional vibrator including an energizing coil 15 as shown, or each set of contacts may be driven synchronously from separate energizing coils. The coil 15 may be connected to a source of alternating current, such as the regulated source of alternating current 9, but in the event that a separate source is employed to energize the coil 15, the source should be of the same frequency and be synchronized with the regulated alternating current source 9.

In operation, the alternating current wave appearing across the secondary winding 12 is synchronously rectified by means of the contacts 14, and applied to the center tap of the primary winding 6 as a substantially unidirectional voltage having a polarity and magnitude which is determined by the phase and amplitude of the wave appearing across the secondary winding 12. Thus, by moving the core 13 a voltage may be applied to the center tap of the primary winding 6 of a selected polarity and magnitude.

In a state of balance, the voltage applied to the center tap of the primary winding 6 is substantially equal to the voltage applied to the movable contact of the set of contacts 8, therefore, no current flows through the primary winding 6, and no signal appears across the secondary winding 4 of the transformer 7. However, upon a variation in the input signal applied to the terminals 5, current flows through the primary winding 6; first in one direction, and then in the opposite direction, as the contacts 8 switch the input signal from one end to the other of the primary winding 6. The result is that a wave appears across the secondary winding 4 of one phase or of opposite phase depending upon the direction of variation of the input signal, and of a magnitude corresponding to the extent of the variation of the input signal.

The wave appearing across the secondary winding 4 of the transformer 7, may be amplified by an amplifier 16 and applied to one winding 17 of a reversible motor 18. In addition to the winding 17, the motor 18 includes a winding 19 to which there is applied an alternating current wave from the source 9. As in the case of the energizing coil 15 described above, the winding 19 of the motor 18 may be energized from a separate source of alternating current, but the separate source should be of the same frequency and be synchronized with the regulated source 9. The motor 18 may be a conventional servo motor of the type which is adapted to rotate in one direction or the other in response to the phase of the wave applied to the winding 17.

In order to rebalance the servo system upon a variation in the input signal applied to the terminals 5, the motor 18 may be mechanically linked to the movable core 13 of the differential transformer 11 so that the core 13 is repositioned. Although any type of mechanical linkage may be employed, Fig. 1 shows a cam 20 which is adapted to be rotated by the motor 18, and a cam follower 21 journalled in a pivoted arm 22. As the motor rotates the cam follower 21 follows the configuration of the cam 20, and the movable core is positioned from the pivoted arm 22 via a connecting rod 23.

As the system approaches a state of balance, the wave appearing at the secondary winding 4 of the transformer 7 decreases and the motor 18 is brought to rest with the movable core 13 in a position in which the rebalancing signal applied to the center tap of the transformer winding 6 is substantially equal to the input signal applied to the movable contact of the set of contacts 8. Since the position of the mechanical portion of the system is a function of the input signal, the mechanical portion of the system may be linked to control external apparatus (not shown). For example, graphic recording equipment may be linked to the mechanical portion of the system to provide a visible record of the variations in the input signal.

Figure 2:
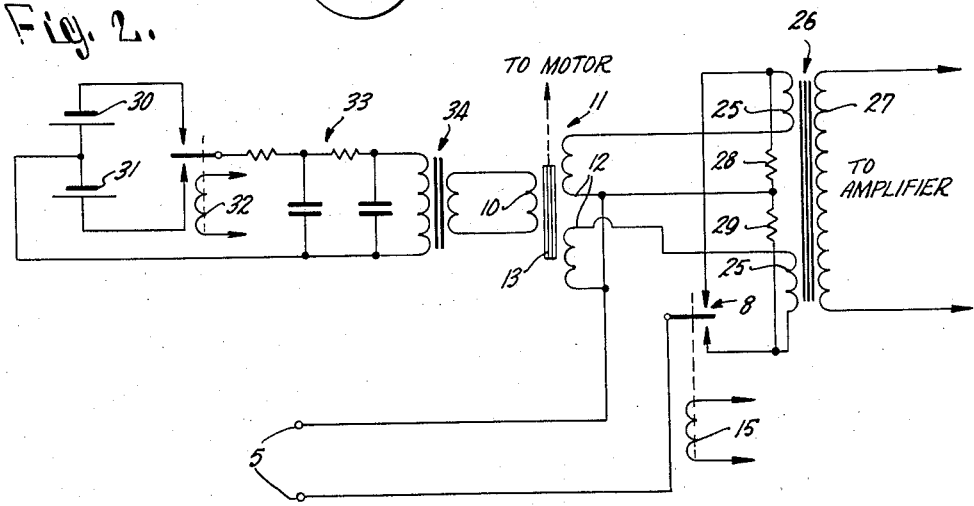
Fig. 2 is a schematic circuit diagram of an alternative balancing and differential-transformer circuit.
Figure 3:
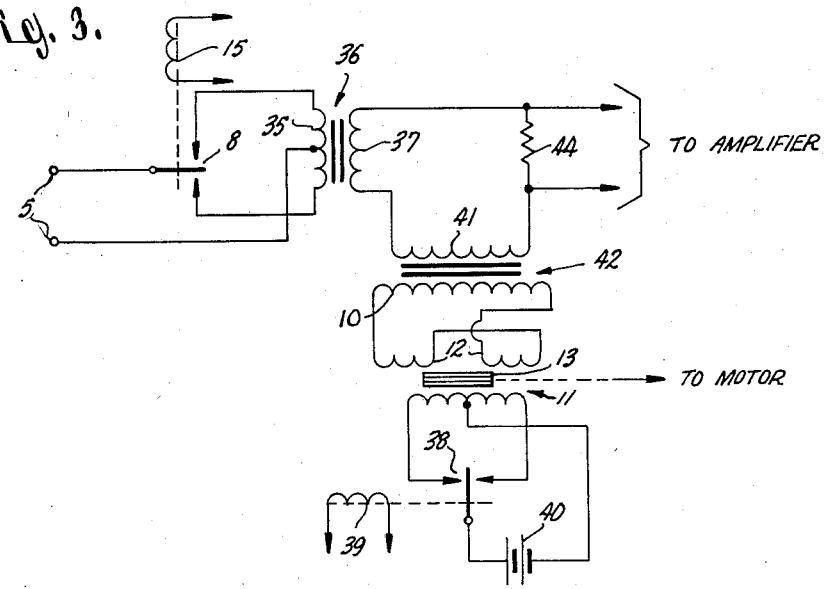
Fig. 3 is a schematic circuit diagram of another alternative balancing and differential-transformer circuit.
Figure 4:
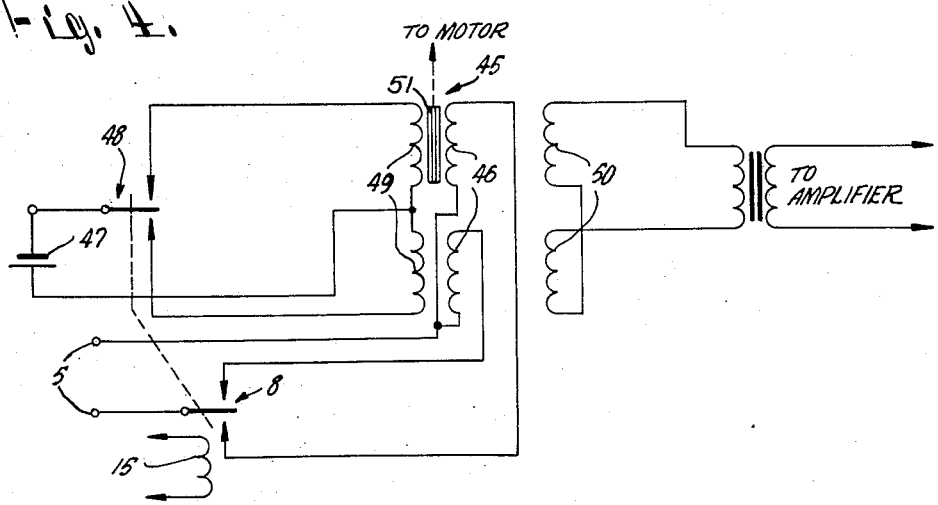
Fig. 4 is a schematic circuit diagram of still another alternative balancing and differential-transformer circuit.

In Figs. 2-4, alternative circuits are shown in which a differential transformer is used as a balancing element. Although the mode of operation of each of the circuits is substantially different, for convenience similar numbers have been used to designate similar parts where appropriate.

In the circuit of Fig. 2, an input signal is converted to an alternating current signal by the signal-pole double-throw contacts 8 and applied to a divided primary winding 25. The separate portions of the divided primary winding 25 are each connected serially with one of the sections of the secondary winding 12 of the differential transformer 11. The common connection between the sections of the secondary winding 12 is returned to opposite ends of the primary winding 25 via the resistors 28 and 29. In operation, a wave passed by the differential transformer 11 counterbalances the alternating current signal generated by the contacts 8.

Across a secondary winding 27 of the transformer 26, appears a wave of reversible phase and variable amplitude which may be amplified and used to control the rotation of a reversible motor which is linked to the core 13 of the differential transformer 11 in a manner similar to that described above in connection with Fig. 1.

Included in the apparatus of Fig. 2 is one suitable circuit for generating a regulated alternating current wave in which a pair of standard cells 30 and 31 are connected serially across the fixed contacts of a set of single-pole double-throw contacts 31. The contacts 31 may be included in a conventional vibrator which contains an energizing coil 32 adapted to be energized from a source of alternating current. Between the movable contact of the set of contacts 31 and the intermediate connection between the batteries 30 and 31 appears an alternating current wave which may be passed to the primary winding 10 of the differential transformer 11 via a phase shifting network 33 and an impedance matching transformer 34. The phase shifting network, comprising two similar sections for shifting the phase of the wave by forty-five degrees each, functions to adjust the phase of the wave appearing at the secondary winding 12 of the differential transformer 11 to compensate for the phase shift occurring in the transformer 34 and the differential transformer 11. Where the energizing coils 15 and 32 are both connected to the same source of alternating current, the phase correction provided by the network 33 is required, but it will be appreciated that the requisite phase correction may also be provided by driving the energizing coils 15 and 32 by alternating current waves having appropriate phases.

In Fig. 3, the balancing operation also takes place on an alternating current basis. The input signal applied to the terminals 5 is converted to an alternating current signal by the contacts 8 and applied to a center tapped primary winding 35 of a transformer 36. Across the secondary winding 37 of the transformer 36 appears a wave of reversible phase and variable amplitude depending upon the polarity and magnitude of the input signal.

A set of contacts 38, actuated by an energizing coil 39 to which may be applied an alternating current wave synchronized with the wave applied to the energizing coil 15, converts a voltage derived from a battery 40 to alternating current. The alternating current wave produced by the contacts 38 may be applied to the primary winding 10 of the differential transformer 11 via a phase shifting network (not shown). The rebalancing signal is passed by the differential transformer 11 and appears across a secondary winding 41 of an impedance matching transformer 42 where it opposes the alternating current signal derived from the input signal appearing across the secondary winding 37 of the transformer 36. When the system is balanced, no net output signal appears across a resistor 44. However, upon a variation in the input signal applied to the terminals 5, a wave of reversible phase and variable amplitude appears across the resistor 44. The wave appearing across the resistor 44 may be used as described above to control the rotation of a motor and the repositioning of the movable core 13 of the differential transformer 11.

In Fig. 4, a balancing circuit is shown which includes a differential transformer 45, having an additional winding 46, such that the balancing action takes place within the transformer itself. The rebalancing signal may be derived from a regulated source of alternating current such as a standard cell 47 connected to contacts 48 and applied to a center tapped winding 49. The input signal applied to the terminals 5 is converted to alternating current by the contacts 8 and applied to the sections of the winding 46 which are connected in phase opposition.

Both the contacts 48 and the contacts 8 may be actuated by the same energizing coil 15, and since both the alternating current signal applied to the winding 46 and the alternating current rebalancing signal applied to the winding 49 are of like phase, the apparatus of Fig. 4 has the advantage of not requiring a phase shifting network to adjust the phase of the waves for proper operation.

In a condition of balance, the fields in the differential transformer cancel, and substantially no signal appears across a secondary winding 50 of the differential transformer 45. However, as in the previously described balancing circuits, a variation in the input signal applied to the terminals 5 results in a wave appearing at the secondary winding 50 which may be amplified and used to control a reversible motor to reposition the movable core 51 associated with the differential transformer 45 and a state of balance is achieved in the system.

From the foregoing, it will be apparent to those skilled in the art that this invention provides an improved and very satisfactory servo system capable of achieving the objects and advantages herein set forth. It will be apparent, however, that variations may be made in the system without departing from the novel features thereof, consequently, the invention shall not be limited to the described embodiment, except as defined by the appended claims.

What is claimed is:

1. In a servo system adapted to respond to a unidirectional electrical input signal by achieving a condition of internal balance, the combination of a balancing circuit; means applying said unidirectional electrical input signal to said balancing circuit; an amplifier coupled to said balancing circuit; a reversible motor coupled to said amplifier; a differential transformer having a primary winding, a secondary winding, and a movable core; a source of alternating current coupled to said primary winding; means coupling said secondary winding to said balancing circuit; said balancing circuit including means for generating an alternating current wave representing a condition of electrical unbalance; and means linking said motor to said core whereby a state of balance is achieved in said balancing circuit with the position of said movable core representing a function of the magnitude of said input signal.

2. In a servo system in which a mechanical element is positioned as a function of a unidirectional electrical input signal representing a variable condition, the combination of a comparison circuit having a first input circuit, a second input circuit, and an output circuit; means applying the unidirectional electrical input signal to said first input circuit; a differential transformer having a primary winding, a secondary winding, and a movable core; means energizing said primary winding with alternating current; means coupling said secondary winding to said second input circuit; said comparison circuit including means for generating an alternating current wave representing a condition of electrical unbalance; means coupled to said output circuit for translating electrical signals into mechanical motion; and means linking said translating means to said movable core whereby said movable core is positioned as a function of the variable condition represented by the input signal.

3. In a servo system adapted to achieve a state of internal balance in response to a unidirectional electrical input signal, the combination of means for converting said unidirectional input signal to an alternating current signal having a predetermined frequency; a source of alternating current of said predetermined frequency; a differential transformer including a primary winding, a secondary winding and a movable core; means coupling said primary winding to said source; a comparison circuit coupled to said secondary winding and said input signal converting means for providing an output signal of reversible phase and variable amplitude in accordance with variations in said input signal; means coupled to said comparison circuit for translating said output signal into mechanical motion; and means linking said translating means to said movable core to position said core to balance said system.

4. In a servo system adapted to achieve a state of internal balance in response to a unidirectional electrical input signal, the combination of an input circuit; a source of alternating current; a differential transformer including a primary winding, a second winding and a movable core; means coupling said primary winding to said source; means coupled to said secondary winding for converting an alternating current wave to a unidirectional voltage; means coupled between said input circuit and said converting means for comparing said input signal with said unidirectional voltage; means coupled to said comparing means for generating an alternating current wave of reversible phase and variable amplitude in accordance with variations in said input signal; means coupled to said alternating current generating means for translating said alternating current wave into mechanical motion; and means linking said translating means to said movable core to position said core to balance said system.

5. In a servo system in which a mechanical element is positioned as a function of a unidirectional electrical input signal, the combination of a converter for converting said input signal to an alternating current wave having a reversible phase and variable amplitude corresponding to the polarity and magnitude of the input signal; a differential transformer including a primary winding, a secondary winding, and a movable core; said differential transformer being adapted to pass an alternating current wave of reversible phase and variable amplitude as a function of the position of said movable core; means energizing the primary winding of said different transformer from a source of alternating current; a balancing circuit coupled between said input signal converter and said secondary winding for opposing said alternating current signal corresponding to said input signal and said alternating current wave passed by said differential transformer; and means coupled to said balancing circuit for positioning said movable core as a function of the value of said input signal and said alternating current wave passed by said differential transformer.

6. In a servo system in which a mechanical element is positioned as a function of a unidirectional electrical input signal, the combination of a converter for converting said input signal to an alternating current wave of a predetermined frequency having a reversible phase and variable amplitude corresponding to the polarity and magnitude of the input signal; a differential transformer including a first primary winding, a second primary winding, a secondary winding, and a movable core; means coupling said converter to said first primary winding; means energizing said second primary winding from a source of alternating current having a frequency equal to said predetermined frequency; and means coupled to said secondary winding for positioning said movable core as a function of variations in said input signal.

7. In a servo system in which a mechanical element is positioned as a function of a unidirectional electrical input signal, the combination of a switch adapted to be actuated at a predetermined rate, means applying an input signal to said switch to convert the input signal to an alternating current signal of reversible phase and variable amplitude in accordance with the polarity and magnitude of the input signal; a differential transformer having a primary winding, a secondary winding and a movable core; means energizing said primary winding from a source of alternating current having a frequency equal to the predetermined rate at which said switch is adapted to be actuated; said differential transformer being adapted to pass a wave to said secondary winding of reversible phase and variable amplitude in accordance with the position of said movable core; a balancing circuit coupled between said switch and said secondary winding for providing an alternating current output signal of reversible phase and variable amplitude corresponding to the difference between said alternating current signal from said switch and said alternating current wave passed by said differential transformer; and means coupled to said balancing circuit for positioning said movable core to reduce said output signal from said balancing circuit to substantially zero.

8. In a servo system adapted to position a mechanical element in accordance with an electrical input signal, and having a balancing circuit in which a unidirectional input signal is compared with a unidirectional rebalancing signal, means for generating the rebalancing signal including in combination a source of alternating current of constant amplitude; a differential transformer having a primary winding, a secondary winding, and a movable core; means coupling said source to said primary winding; means coupled to the secondary winding for converting an alternating current wave to a unidirectional rebalancing voltage means coupling said converting means to the balancing circuit; and means coupled to the balancing circuit for positioning the movable core in accordance with variations in said input signal.

References Cited in the file of this patent

UNITED STATES PATENTS

| | | |
|---|---|---|
| 2,406,221 | Hornfeck | Aug. 20, 1946 |
| 2,568,588 | MacGeorge | Sept. 18, 1951 |

UNITED STATES PATENT OFFICE
CERTIFICATE OF CORRECTION

Patent No. 2,881,375                                                April 7, 1959

Charles J. Kennedy

It is hereby certified that error appears in the printed specification of the above numbered patent requiring correction and that the said Letters Patent should read as corrected below.

Column 4, lines 22 and 23, for "appropirate" read -- appropriate --; column 5, line 70, for "second" read -- secondary --; column 6, line 20, for "different" read -- differential --.

Signed and sealed this 28th day of July 1959.

(SEAL)
Attest:

KARL H. AXLINE
Attesting Officer

ROBERT C. WATSON
Commissioner of Patents